US006580707B1

United States Patent
Ikeda et al.

(10) Patent No.: US 6,580,707 B1
(45) Date of Patent: Jun. 17, 2003

(54) ATM REPEATER USING HARDWARE IMPLEMENTED TRANSFER DESTINATION SEARCHING TO REDUCE PROCESSOR LOAD

(75) Inventors: Katsuhiko Ikeda, Hino (JP); Kazuo Nogami, Sagamihara (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/308,133

(22) PCT Filed: Sep. 17, 1998

(86) PCT No.: PCT/JP98/04195

§ 371 (c)(1),
(2), (4) Date: May 14, 1999

(87) PCT Pub. No.: WO99/14896

PCT Pub. Date: Mar. 25, 1999

(30) Foreign Application Priority Data

Sep. 17, 1997 (JP) ............................................. 9-252161

(51) Int. Cl.[7] ............................................. H04L 12/56
(52) U.S. Cl. ....................................... 370/351; 370/389
(58) Field of Search ................................ 370/389, 351, 370/401, 395

(56) References Cited

U.S. PATENT DOCUMENTS

| 5,467,349 A | * | 11/1995 | Huey et al. | ................. 370/397 |
| 6,034,958 A | * | 3/2000 | Wicklund | ............. 370/395.32 |
| 6,088,356 A | * | 7/2000 | Hendel et al. | .............. 370/392 |
| 6,118,760 A | * | 9/2000 | Zaumen et al. | ............. 370/229 |

FOREIGN PATENT DOCUMENTS

| JP | 6-261078 | 9/1994 |
| JP | 7-30587 | 1/1995 |
| JP | 8-102744 | 4/1996 |
| WO | WO 94/22253 | 9/1994 |

OTHER PUBLICATIONS

Technical Report of IEICE, SSE95–201, IEICE, vol. 95, No. 577, p. 175, Mar. 15, 1996.

* cited by examiner

Primary Examiner—Thanh Cong Le
Assistant Examiner—Nick Corsaro
(74) Attorney, Agent, or Firm—Finnegan, Henderson, Farabow, Garrett & Dunner, L.L.P.

(57) ABSTRACT

The present invention aims at implementing acceleration of the hop-by-hop transfer without using a high-speed processor. In the present invention, a transfer destination searching circuit (12) constituted by hardware is provided in addition to a processor (11). In the transfer destination searching circuit (12), after header information has been extracted from received IP packet data, a content addressable memory (21) is first searched by using the header information as a key. If corresponding forwarding information cannot be obtained from the searching of the content addressable memory (21), HASH function searching is executed by employing an HASH searching pointer table (22). If the forwarding information is obtained from a forwarding table (23) as a result of these searching operations, the hop-by-hop transfer of the IP packet data is executed in accordance with the forwarding information.

7 Claims, 7 Drawing Sheets

CONTENT ADDRESSABLE MEMORY 21

| | SEARCH KEY | | | | POINTER |
|---|---|---|---|---|---|
| 1 | D_IP_Address | S_IP_Address | | | Pointer |
| 2 | D_IP_Address | S_IP_Address | D_Port# | S_Port# | Pointer |
| 3 | D_IP_Address | | | | Pointer |
| ⋮ | | | | | |
| n | D_IP_Address | S_IP_Address | D_Port# | S_Port# | Pointer |

D_IP_Address : DESTINATION IP ADDRESS
S_IP_Address : SOURCE IP ADDRESS
D_Port#      : DESTINATION PORT NUMBER
S_Port#      : SOURCE PORT NUMBER
Pointer      : POINTER INFORMATION FOR FORWARDING TABLE

FIG. 4

HASH SEARCHING POINTER TABLE 22

| | IP-Address <-> Pointer | |
|---|---|---|
| 1 | D_IP_Address | Pointer |
| 2 | D_IP_Address | Pointer |
| ⋮ | | |
| k | D_IP_Address | Pointer |

D_IP_Address : DESTINATION IP ADDRESS
Pointer      : POINTER FOR FORWARDING TABLE

FIG. 5

FORWARDING TABLE 23

| | FORWARDING INFORMATION | | |
|---|---|---|---|
| 1 | VPI, VCI | QOS Flag | etc. |
| 2 | VPI, VCI | QOS Flag | etc. |
| ⋮ | | | |
| m | VPI, VCI | QOS Flag | etc. |

ATM REPEATER USING HARDWARE IMPLEMENTED TRANSFER DESTINATION SEARCHING TO REDUCE PROCESSOR LOAD

TECHNICAL FIELD

The present invention relates to a repeater provided to execute packet routing process in, for example, a computer network or LAN, and more particularly to an ATM repeater using particularly an ATM switch.

BACKGROUND ART

A repeater generally called a router has the hop-by-hop transfer mode as one of packet routing modes. The hop-by-hop transfer mode is a mode of extracting a destination IP address and control information from the input IP packet data, determining the transfer destination in accordance with the extracted destination IP address and control information, and transmitting the IP packet data in a line corresponding to the transfer destination, in a network layer. This process is conventionally implemented by the software process with a processor.

Figure 1:
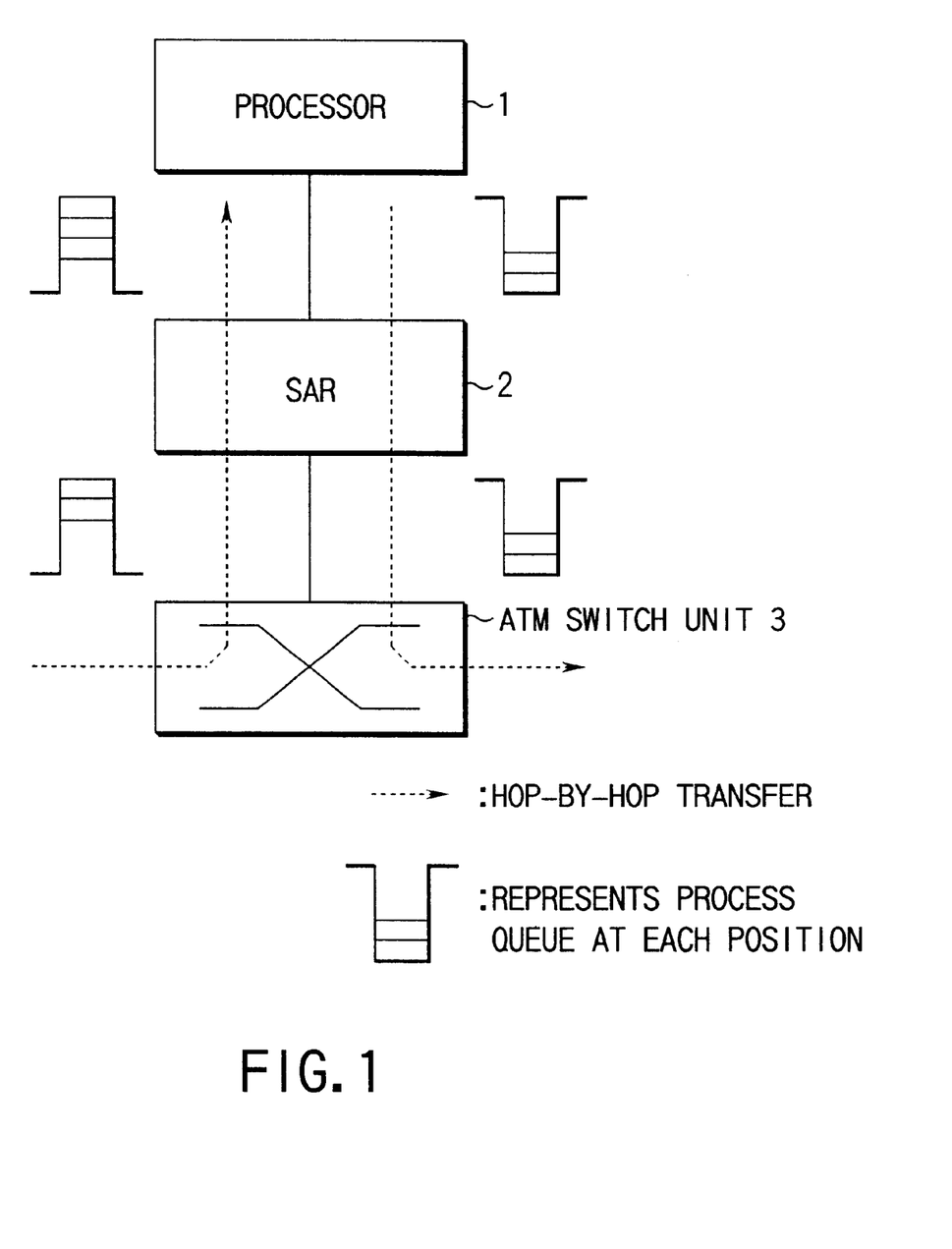
FIG. 1 is a block diagram showing a schematic configuration of a conventional ATM repeater.

In an ATM repeater, for example, a processor which is a microcomputer is provided to execute the address searching process for the hop-by-hop transfer. FIG. 1 is a circuit block diagram showing a schematic configuration of a conventional ATM repeater.

In FIG. 1, when a plurality of ATM cells arrive via the lines of the upstream side, these cells are transmitted to a cell disassembly/assembly unit (SAR: Segmentation and Reassembly Sublayer) 2 via an ATM switch 3 and reconstructed as the packet.

A processor 1 inputs the reconstructed packet, extracts the IP header information and analyzes the destination IP address. Then, the processor 1 accesses a forwarding table by using the analyzed destination IP address as the key information.

Output line information (Next hop) corresponding to the destination IP address is stored in advance on this forwarding table, the IP sub-network or host to which the destination IP address belongs is searched by the processor 1, and an output line connected to the IP sub-network or host is determined as the transfer destination. The ATM switch 3 is controlled by the processor 1 so that the packet can be transferred via the output line, and the received packet is disassembled in the SAR 2 into ATM cells, that are transmitted from the ATM switch 3 to the output line.

However, in this conventional ATM repeater, extraction of the destination IP address relating to the hop-by-hop transfer and search of the output line information are entirely executed with the software process using the processor 1. For this reason, there is a problem that load is applied to the processor 1 and the transfer speed of the hop-by-hop transfer is thereby limited by performance of the processor 1. A higher-speed processor 1 needs to be used in order to improve the performance of the repeater. If this is used, the cost of the repeater is increased since the processor 1 is expensive, which is very undesirable.

The present invention is accomplished in consideration of this circumstance, and its objet is to provide an ATM repeater which implements acceleration of the hop-by-hop transfer without employing a highspeed processor and which is thereby cheap with high performance.

DISCLOSURE OF INVENTION

In order to achieve the above object, the present invention provides an ATM repeater having the hop-by-hop transfer mode to execute the packet routing process in the network layer, in which a transfer destination searching circuit constituted by a hardware circuit is provided by using at least a content addressable memory, and in which the transfer destination searching circuit extracts the header information from the packet transferred through a line of the upstream side, thereby executing a process of searching for the transfer destination in accordance with the header information.

According to the present invention, the processes of extracting the header information concerning the hop-by-hop transfer and searching for the transfer destination are executed by the hardware processing. For this reason, acceleration of the hop-by-hop transfer can be implemented as compared with a conventional repeater which allows the processes to be executed by the software processing, and the price of the repeater can be lowered since a high-speed processor does not need to be prepared.

The present invention further comprises a processor for executing a transfer destination searching operation for the hop-by-hop transfer, with software, and is characterized in that when the transfer destination information corresponding to the header information extracted from the packet cannot be obtained by the transfer destination searching circuit, the header information is supplied to the processor to execute the transfer destination searching process with the software.

With this constitution, when the transfer destination concerning the hop-by-hop transfer is not searched by the hardware processing employing the transfer destination searching circuit, searching the transfer destination is executed with the software processing of the processor. That is, processes of extracting the header information concerning the hop-by-hop transfer and searching for the transfer destination are executed by cooperation of the hardware processing of the transfer destination searching circuit and the software processing of the processor. For this reason, for example, if the transfer destination information concerning the communications of a comparatively higher frequency is registered in advance in the transfer destination searching circuit and the transfer destination information concerning the communications of a comparatively lower frequency is registered in advance in the processor, the packet concerning the communications of a comparatively higher frequency at a general time can be transferred at a high speed by the hardware processing of the transfer destination searching circuit, and the packet which rarely arrives, i.e. which concerns the communications of a comparatively lower frequency can be transferred by the software processing of the processor. As a result, the transfer destination information corresponding to all the header information items do not need to be registered in advance in the transfer destination searching circuit and thereby the capacity of the content addressable memory in the transfer destination searching circuit can be reduced.

Further, in the present invention, the content addressable memory for reading pointer information corresponding to the header information extracted from the packet, and a compression searching memory for compressing the header information on the basis of a predetermined compression algorithm such as an HASH function and reading pointer information corresponding to the compressed information, are provided in the transfer destination searching circuit. First, the content addressable memory is accessed to search for the pointer information corresponding to the header information. If the pointer information corresponding to the header information cannot be searched by the access to the content addressable memory, the compressed searching memory is also accessed to search for the corresponding pointer information.

With this operation, the following advantages can be achieved. That is, generally, the content addressable memory has small memory capacity and expensive though its operating speed is high. On the other hand, an SRAM or DRAM, which is comparatively cheap and has a large capacity, is used as the compression searching memory. Therefore, by allowing the content addressable memory to store not the transfer destination information of all the communications that are to be processed by the hop-by-hop transfer, but the only transfer destination information concerning some communications of a particularly higher communication frequency, and by allowing the compression searching memory to store the other information items, the memory capacity of the content addressable memory can be reduced and thereby the price of the repeater can be set to be cheap.

Moreover, in the present invention, when the transfer destination searching circuit reads the pointer information from the content addressable memory, the transfer destination searching circuit first accesses the content addressable memory by using a plurality of predetermined information items included in the header information as key information items. If the corresponding pointer information cannot be searched by the access, the transfer destination searching circuit accesses the content addressable memory by using parts of the plurality of information items included in the first information as key information items.

With this structure, in the communications of a higher frequency, the packet can be transferred by searching for the transfer destination more certainly in a shorter time in accordance with many information items in the header information.

BEST MODE OF CARRYING OUT THE INVENTION

The present invention will be described in detail with reference to the attached drawings.

Figure 2:
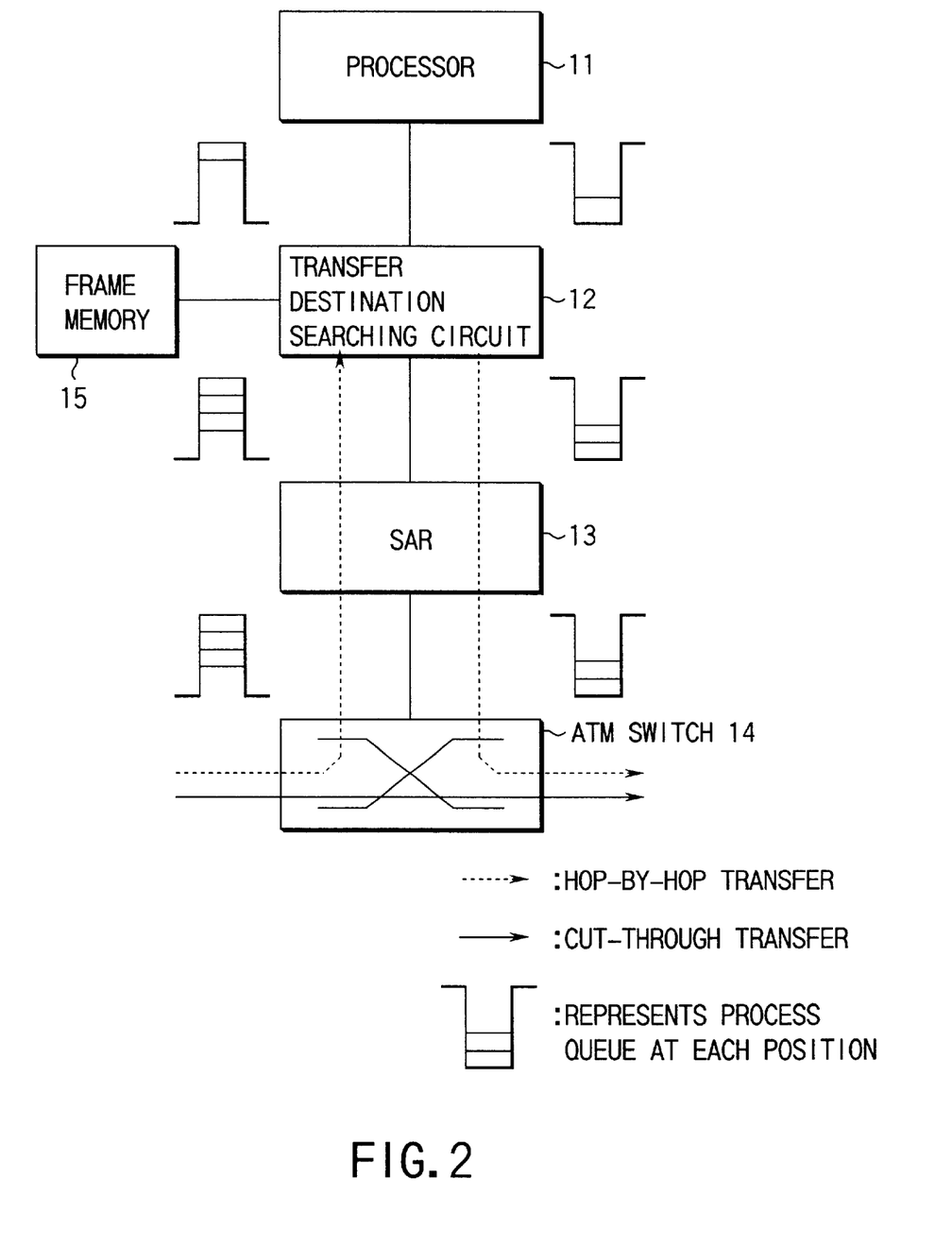
FIG. 2 is a block diagram showing an embodiment of an ATM repeater according to the present invention.

FIG. 2 is a circuit block diagram showing a embodiment of an ATM repeater according to the present invention.

Figure 3:
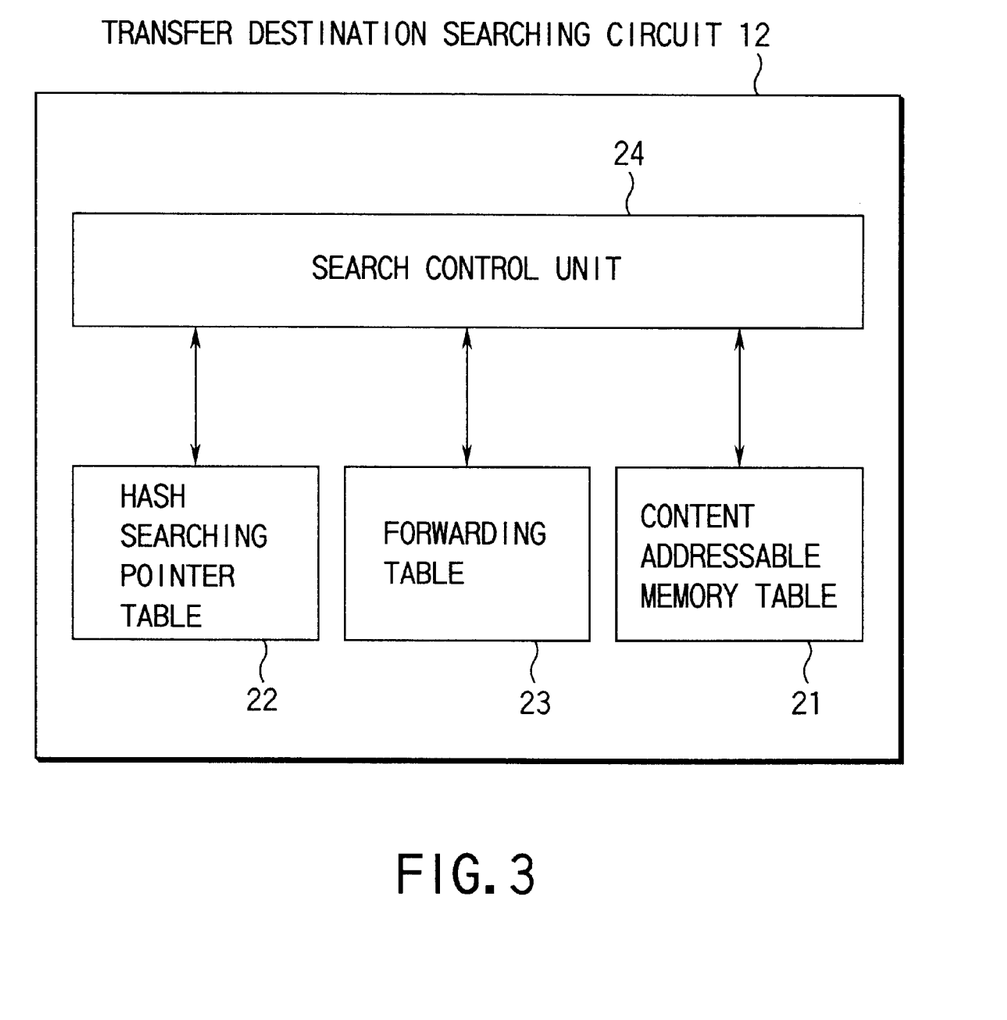
FIG. 3 is a block diagram showing a configuration of a transfer destination searching circuit in the repeater shown in FIG. 2.

The ATM repeater of the present embodiment comprises a processor 11, a cell assembly/disassembly unit (SAR) 13, an ATM switch 14 and a frame memory 15, and also a transfer destination searching circuit 12. The transfer destination searching circuit 12, arranged entirely by the hardware, is constituted by a content addressable memory 21, an HASH searching pointer table 22, a forwarding table 23 and a search control unit 24 as shown in FIG. 3.

Figure 4:
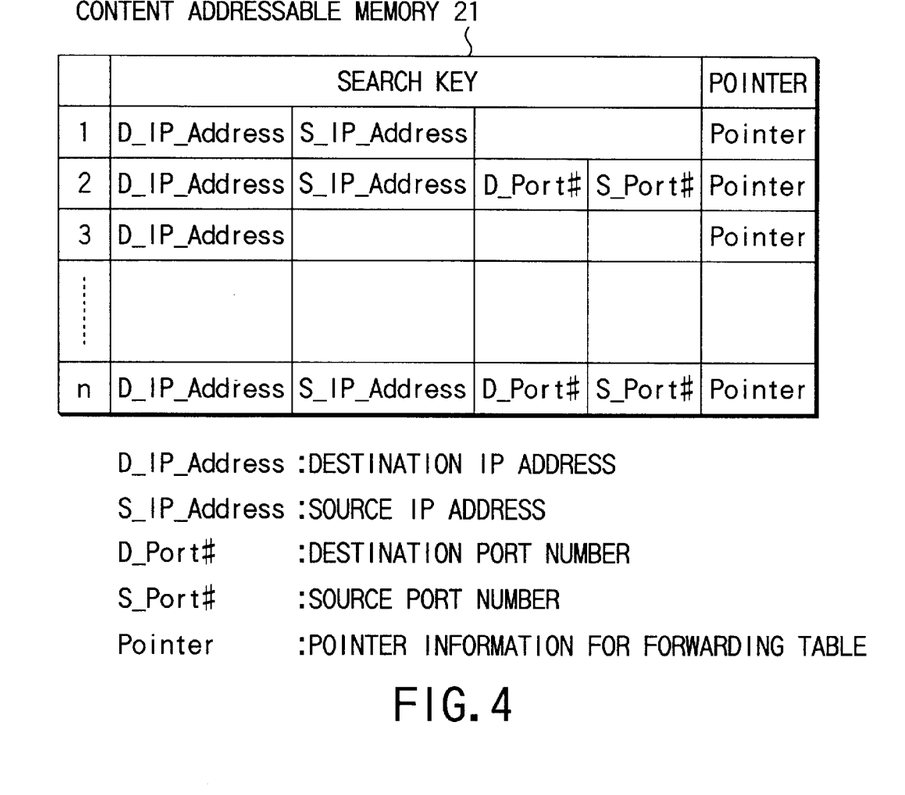
FIG. 4 is a view showing an example of a configuration of a content addressable memory in the transfer destination searching circuit shown in FIG. 3.

The header information and the pointer information concerning communications of a comparatively high frequency of communication are stored in advance in the content addressable memory 21. FIG. 4 shows an example of the stored information. Destination IP addresses, source IP addresses, destination port numbers and source port numbers, which constitute the header information, are stored as search keys, and pointer information corresponding to the header information is also stored. The pointer information is used as a key when a forwarding table 23 to be described later is searched. The content addressable memory 21 has a search function of executing the searching by using the input header information as the search key, and outputting the pointer information corresponding to the header information when the corresponding header information is stored.

Figure 5:
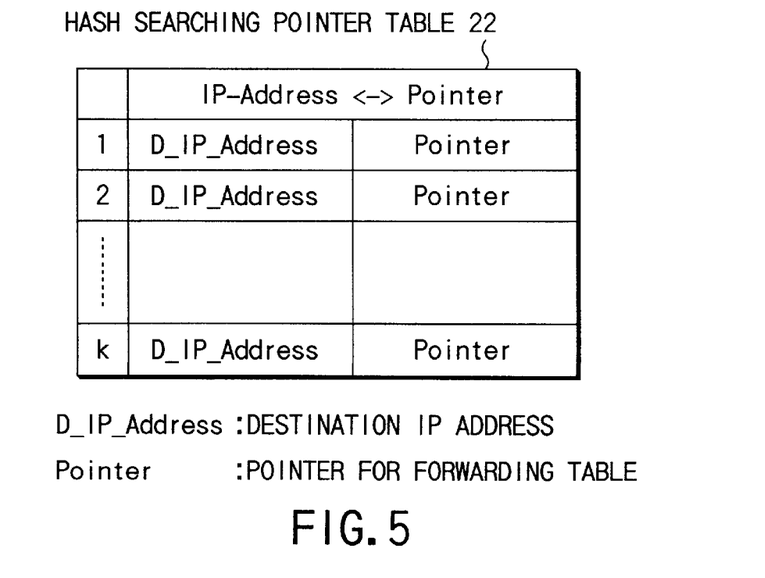
FIG. 5 is a view showing an example of a configuration of a HASH searching pointer table in the transfer destination searching circuit shown in FIG. 3.

The HASH searching pointer table 22 is used when a transfer destination is searched by an HASH function, and the destination IP addresses and pointer information concerning the communications of low frequency of communication are stored in, for example, SRAMs and DRAMs. FIG. 5 shows an example of the stored information.

Figure 6:
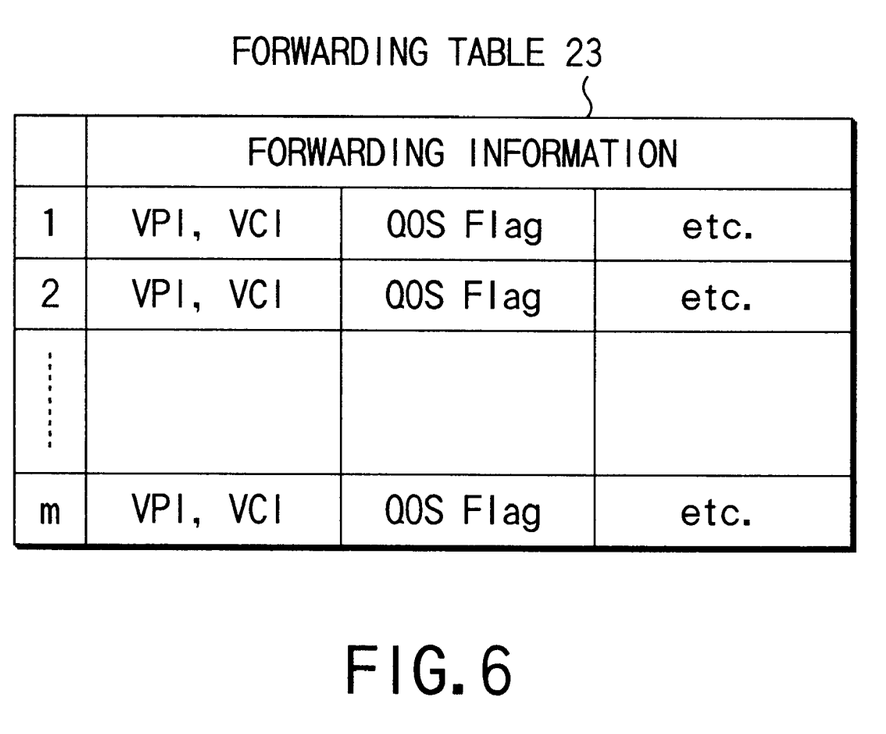
FIG. 6 is a view showing an example of a configuration of a forwarding table in the transfer destination searching circuit shown in FIG. 3.

Various kinds of the forwarding information items are stored in advance on the forwarding table 23. FIG. 6 shows an example of the stored information. VPIs (Virtual Path Identifiers), VCIs (Virtual Channel Identifiers), QOS flags (Quality of Service Flags) and the like are stored as the forwarding information.

The search control unit 24 is constituted by, for example, a logic circuit, which extracts the header information from the IP packet data stored temporarily in the frame memory 15. In accordance with the extracted header information, the search control unit 24 selectively accesses the content addressable memory 21 or the HASH searching pointer table 22 and searches for the corresponding pointer information. The search control unit 24 also accesses the forwarding table 23 in accordance with the researched pointer information to search for the corresponding forwarding information.

The processor 11 has a function of searching for the hop-by-hop transfer destination by the software process in the same manner as that seen in the prior art. If the transfer destination cannot be searched by the transfer destination searching circuit 12, the processor 11 executes its own searching function to search for the transfer destination.

Next, the hop-by-hop transfer operation executed in the repeater constituted as described above will be explained.

When a plurality of ATM cells arrive via the lines of the upstream side, these cells are transmitted to the SAR 13 via the ATM switch unit 14 and reconstructed in the SAR 13 to the IP packet data, which is stored in the frame memory 15.

When the IP packet data is stored in the frame memory 15, the transfer destination searching circuit 12 extracts the header information from the IP packet data by the search control unit 24. The search control unit 24 uses the destination IP address, the source IP address, the destination port number and the source port number included in the header information as the keys to execute the following search for the transfer destination information (i.e. the forwarding information).

Figure 7:
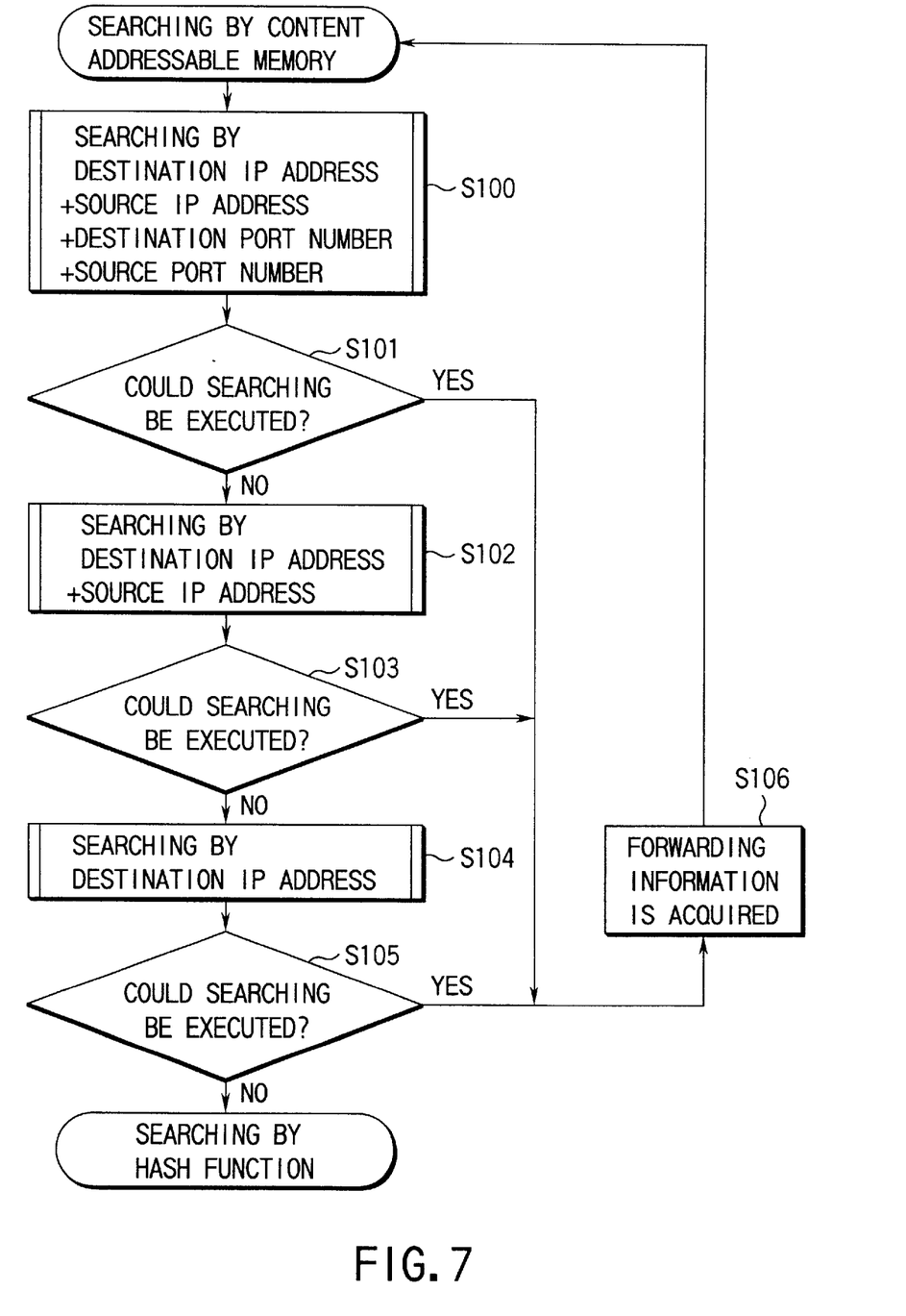
FIG. 7 is a flow chart showing IP address searching steps using the content addressable memory in the transfer destination searching circuit shown in FIG. 3 and the contents of the IP address searching steps.

That is, first, searching is executed by the content addressable memory 21. FIG. 7 is a flow chart showing its operation steps and the contents of the operations.

In step S70, the search control unit 24 inputs all the information items included in the header information, i.e. the destination IP address, the source IP address, the destination port number and the source port number to the content addressable memory 21. The content addressable memory 21 searches for the header information which all of these information items match and transmits the pointer information corresponding to the matched header information back to the search control unit 24. If the header information which all of these information items match is stored, step S71 shifts to step S76, in which the search control unit 24 accesses the forwarding table 23 in accordance with the pointer information to acquire the corresponding forwarding information (VPI, VCI, QOS flag and the like).

The SAR 13 and the ATM switch 14 are operated in accordance with the forwarding information, and thereby the IP packet data stored in the frame memory 15 is disassembled in the SAR 13 into cells, which are transmitted from the ATM switch 14 to the output line.

Once the above forwarding information is acquired, a path for the cut-through transfer is set at the ATM switch 14, and after that, the cells of the same packet arriving via the line of the upstream side are subjected to the cut-through transfer via this path.

On the other hand, it is assumed that the header information which all the information items meet could not have been searched as a result of the searching of the content addressable memory 21. The step shifts to step S72, and the search control unit 24 selects the destination IP address and the source IP address, of all the information items included in the header information, and inputs the destination IP address and the source IP address to the content addressable memory 21. The content addressable memory 21 searches for the matching header information and transmits the pointer information corresponding to the matched header information back to the search control unit 24. That is, the information items that can be the keys are reduced and searching is executed again by the content addressable memory 21. As a result, if the matched header information can be searched, step S73 shifts to step S76 and the corresponding forwarding information is acquired from the forwarding table 23 as mentioned above.

If a plurality of matched header information items exist, the content addressable memory 21 transmits the pointer information corresponding to the header information of a higher priority back to the search control unit 24, in accordance with a predetermined order of priority.

On the other hand, if the matched header information cannot be searched even by the searching using the destination IP address and the source IP address as the keys, the search control unit 24 further reduces the keys to the only destination IP address and inputs the destination IP address to the content addressable memory 21, and the content addressable memory 21 searches for the matching header information and transmits the pointer information corresponding to the matched header information back to the search control unit 24, in step S74. If the matched header information can be searched, the corresponding forwarding information is acquired from the forwarding table 23 in step S76.

Furthermore, if the matched header information cannot be searched, header information matching the destination IP address masked at the MSB side is input again to the content addressable memory 21 to execute the searching, in consideration of a subnet mask. If the matched header information is found, the corresponding forwarding information is acquired from the forwarding table 23 in step S76.

Figure 8:
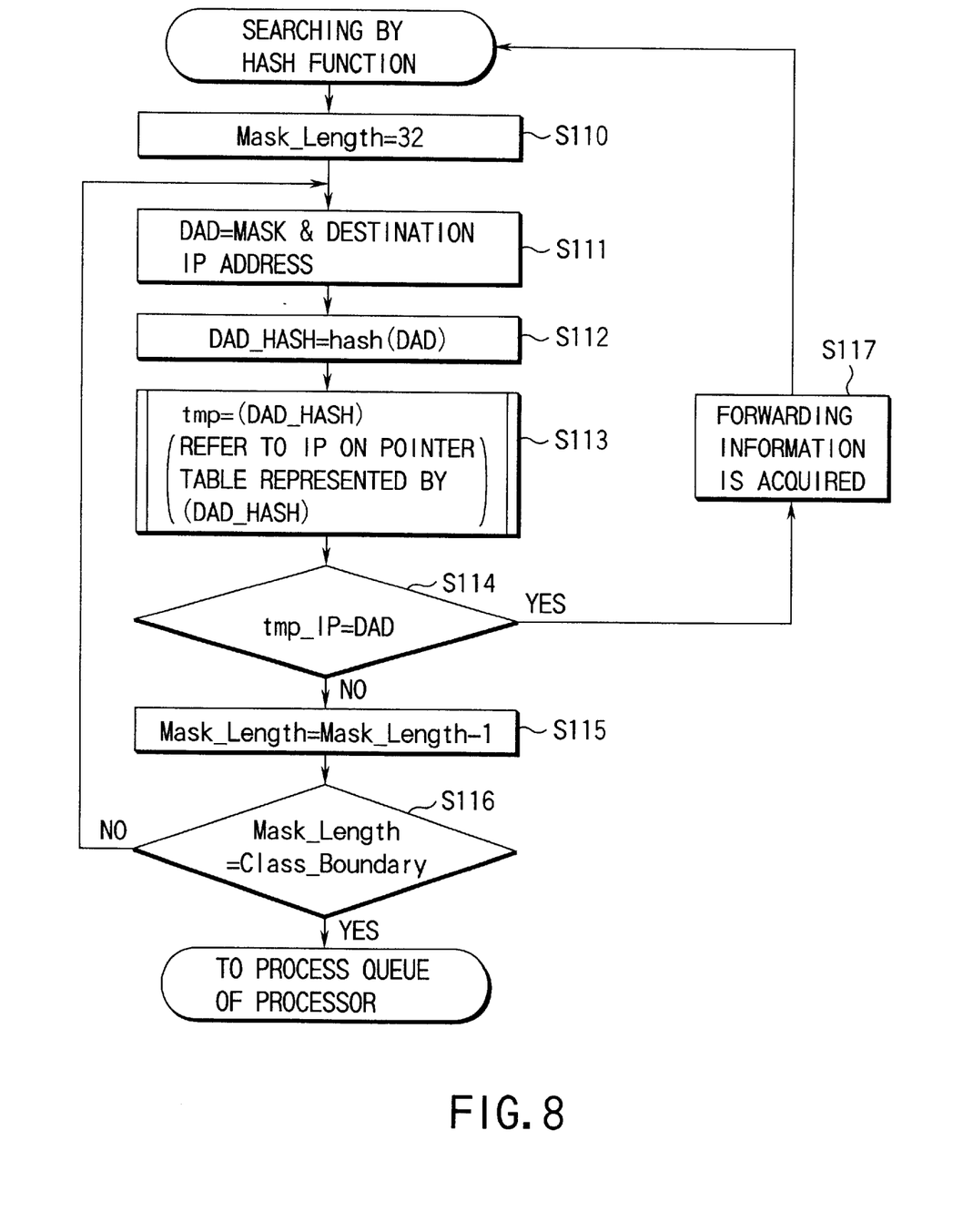
FIG. 8 is a flow chart showing IP address searching steps using the HASH searching pointer table in the transfer destination searching circuit shown in FIG. 3 and the contents of the IP address searching steps.

Incidentally, it is assumed that the transfer destination information cannot be acquired by the above search of the content addressable memory 21. The transfer destination searching circuit 12 shifts to a next operation of searching using the HASH searching pointer table 22. FIG. 8 is a flow chart showing its operation steps and their operation contents.

The HASH function is a function of mapping, for example, a 32-bit destination IP address over a corresponding bit string of less than 32 bits, by a certain compressing algorithm.

The search control unit 24 first sets the mask length at a longest value, i.e. Mask Length=32 in step S80, and inputs a destination IP address masked with the maximum mask value in step S81 to the HASH function in step S82. In step S83, the search control unit 24 refers to a destination IP address of the HASH searching pointer table 22 represented by the output of the HASH function. As a result of the referring, when the destination IP address stored in the HASH searching pointer table 22 matches the masked destination IP address, step S84 shifts to step S87 to read the corresponding pointer information stored on the HASH searching pointer table 22, make an access to the forwarding table 23 by using the pointer information as a key and acquire the corresponding forwarding information (VPI, VCI, QOS flags and the like).

On the other hand, when the destination IP address stored in the HASH searching pointer table 22 does not match the masked destination IP address before being input to HASH function, the mask length is shortened by one bit by considering a subnet mask in step S85 and the destination IP address is masked from the MSB side by the shortened mask length in step S81. Then, search control unit 24 inputs the masked destination IP address to the HASH function in step S82 to refer to the destination IP address on the HASH searching pointer table 22 represented by the output of the HASH function. When the destination IP address stored on the HASH searching pointer table 22 matches the masked destination IP address before being input to HASH function, the corresponding forwarding information is acquired from the forwarding table 23 as described above.

However, when both addresses do not match, the mask length is further shortened by one bit in step S85, and the destination IP address is masked again with the further shortened mask and input to the HASH function. The search control unit 24 refers to the destination IP address on the HASH searching pointer table 22 represented by the output of the HASH function. If a destination IP address matching the masked destination IP address before being input to the HASH function is found, the corresponding forwarding information is acquired from the forwarding table 73. However, if no destination IP address is found, the mask length is further shortened and the above HASH search operation is repeated.

In the above-described HASH search operation, if the forwarding information cannot be acquired by shortening the mask length to a predetermined length, the search control unit 24 shifts from step S86 to the process queue of the processor 11, thereby assigning the operation to the search executed by the software process of the processor 11.

As described above, in the present embodiment, the transfer destination searching circuit 12 constituted by hardware is provided in addition to the processor 11. The transfer destination searching circuit 12 extracts the header information from the received IP packet data and executes searching by using the header information as the key. If the transfer destination searching circuit 12 cannot obtain the corresponding forwarding information by the searching employing the content addressable memory 21, the transfer destination searching circuit 12 subsequently executes the searching employing the HASH function by using the HASH searching pointer table 22. If the transfer destination searching circuit 12 can obtain the forwarding information from these searching, the circuit executes the hop-by-hop transfer of the IP packet data on the basis of the forwarding information.

Therefore, the operation of extracting the header information and the operation of searching the forwarding information, in relation to the hop-by-hop transfer, can be executed by the hardware process of the transfer destination searching circuit, and the hop-by-hop transfer can be thereby accelerated as compared with a case where each of the operations is executed by the software process of the processor 11.

In addition, by executing together the searching employing the content addressable memory 21 and the searching employing the HASH searching pointer table 22, the memory capacity of the content addressable memory 21 can be reduced as compared with a case where the entire searching is executed by the content addressable memory 21 only, and the price of the repeater can be thereby lowered. Further, in this case, by searching the information concerning the communications with particularly high communication frequency by the content addressable memory 21 and the information concerning the other communications by the HASH searching pointer table 22, particularly high-speed hop-by-hop transfer concerning the communications of high communication frequency can be implemented.

Further, when the searching employing the content addressable memory 21 is executed, the searching is first executed by using all the information included in the header information as keys. If the corresponding information cannot be searched by this operation, the searching is executed while gradually reducing the information items serving as the keys, of the information included in the header information. For this reason, the transfer destination can be searched and the packet can be transferred thereto, certainly, in a short time, in accordance with much more information in the header information, with respect to the communications of higher frequency.

Moreover, in the present embodiment, if the forwarding information cannot be obtained as a result of searching employing the content addressable memory 21 and the HASH searching pointer table 22, the searching is executed by the software process of the processor 11. Therefore, even for the communications of an extremely low frequency in which the destination IP address is not entered in the content addressable memory 21 or the HASH searching pointer table 22, the hop-by-hop transfer can be always executed certainly though the high-speed transfer cannot be executed. Further, in all the communications, their destination IP addresses do not need to be entered in the content addressable memory 21 or the HASH searching pointer table 22. Therefore, the constitution of content addressable memory 21 and the HASH searching pointer table 22 can be simplified.

The present invention is not limited to the above-described embodiment. In the embodiment, for example, when the IP packet data is received, the transfer destination thereof is first searched by the transfer destination searching circuit 12. If the transfer destination cannot be searched by the transfer destination searching circuit 12, the hardware searching is changed to the software searching employing the processor 11. However, if the wait queues in the transfer destination searching circuit 12 exceed a predetermined amount, parts of them may be assigned to the processor 11 to search for the transfer destination. With this operation, the searching process employing the transfer destination searching circuit 12 and the searching process employing the processor 11 are executed together, and an effective hop-by-hop transfer process can be there implemented.

Furthermore, the constitution of the transfer destination searching circuit, the steps of searching the transfer destination in the transfer destination searching circuit, and the contents of the searching process, can be variously modified in a range which does not exceed the gist of the present invention.

INDUSTRIAL APPLICABILITY

As described above in detail, in an ATM repeater having the hop-by-hop transfer mode of executing the packet routing process in a network layer, a transfer destination searching circuit constituted by a hardware circuit by use of at least a content addressable memory is provided. The transfer destination searching circuit extracts the header information from the packet transferred through an upstream side line and executes the process of searching for the transfer destination in accordance with the header information. Therefore, the present invention can provide an ATM repeater which implements acceleration of the hop-by-hop transfer without employing a high-speed processor and which is thereby cheap with high performance.

What is claimed is:

1. An ATM repeater having a hop-by-hop transfer mode to execute a packet routing process in a network layer, comprising:

a transfer destination searching circuit for extracting header information from a transferred packet and searching for a transfer destination in accordance with the header information, in a hardware process employing at least a content addressable memory;

an ATM switch for transmitting said packet to a line corresponding to the transfer destination, in accordance with transfer destination information obtained from said transfer destination searching circuit; and a processor for executing a transfer destination searching operation for said hop-by-hop transfer, with software, wherein when the transfer destination information corresponding to the header information extracted from said packet cannot be obtained by said transfer destination searching circuit, said header information is supplied to said processor to execute the transfer destination searching process with the software.

2. An ATM repeater according to claim 1, wherein said transfer destination searching circuit comprises the content addressable memory for reading pointer information corresponding to the header information extracted from the packet, a compression searching memory for compressing said header information on the basis of a predetermined compression algorithm and reading pointer information corresponding to said compressed information when the pointer information corresponding to said header information is not registered in said content addressable memory, and a transfer destination memory for reading transfer destination information corresponding to the pointer information which is read from said content addressable memory or said compression searching memory and supplying said transfer destination information to said ATM switch.

3. An ATM repeater according to claim 2, wherein when said transfer destination searching circuit reads the pointer information from the content addressable memory, said transfer destination searching circuit first accesses the content addressable memory by using a plurality of predetermined information items included in the header information as key information items; and if the corresponding pointer information cannot be searched by said access, said transfer destination searching circuit accesses said content addressable memory by using parts of said plurality of information items included in said first information as key information items.

4. An ATM repeater according to claim 3, wherein when said transfer destination searching circuit reads the pointer information from the content addressable memory, said transfer destination searching circuit first accesses the content addressable memory by using destination address, source address, output port and input port included in the header information as key information items;

if the corresponding pointer information cannot be searched by said access, said transfer destination searching circuit accesses the content addressable memory by using the destination address and the source address of said key information items; and if the corresponding pointer information cannot be further searched by said access, said transfer destination searching circuit accesses the content addressable memory by using the destination address of said key information items.

5. An ATM repeater having a hop-by-hop transfer mode to execute a packet routing process in a network layer, comprising:

a transfer destination searching circuit for extracting header information from a transferred packet and searching for a transfer destination in accordance with the header information, in a hardware process employing at least a content addressable memory; and an ATM switch for transmitting said packet to a line corresponding to the transfer destination, in accordance with transfer destination information obtained from said transfer destination searching circuit, wherein said transfer destination searching circuit comprises the content addressable memory for reading pointer information corresponding to the header information extracted from the packet, a compression searching memory for compressing said header information on the basis of a predetermined compression algorithm and reading pointer information corresponding to said compressed information when the pointer information corresponding to said header information is not registered in said content addressable memory, and a transfer destination memory for reading transfer destination information corresponding to the pointer information which is read from said content addressable memory or said compression searching memory and supplying said transfer destination information to said ATM switch.

6. An ATM repeater according to claim 5, wherein when said transfer destination searching circuit reads the pointer information from the content addressable memory, said transfer destination searching circuit first accesses the content addressable memory by using a plurality of predetermined information items included in the header information as key information items; and if the corresponding pointer information cannot be searched by said access, said transfer destination searching circuit accesses said content addressable memory by using parts of said plurality of information items included in said first information as key information items.

7. An ATM repeater according to claim 6, wherein when said transfer destination searching circuit reads the pointer information from the content addressable memory, said transfer destination searching circuit first accesses the content addressable memory by using destination address, source address, output port and input port included in the header information as key information items;

if the corresponding pointer information cannot be searched by said access, said transfer destination searching circuit accesses the content addressable memory by using the destination address and the source address of said key information items; and if the corresponding pointer information cannot be further searched by said access, said transfer destination searching circuit accesses the content addressable memory by using the destination address of said key information items.

* * * * *